March 17, 1959  G. V. FOWLKES  2,878,071
LAMINATED SKATE WHEEL
Filed June 22, 1955

INVENTOR.
George V. Fowlkes
BY
ATTORNEY

United States Patent Office 2,878,071
Patented Mar. 17, 1959

2,878,071

LAMINATED SKATE WHEEL

George V. Fowlkes, Tulsa, Okla.

Application June 22, 1955, Serial No. 517,263

2 Claims. (Cl. 301—5.3)

This invention relates to improvements in roller skate wheels, and more particularly, but not by way of limitation, to a skate wheel having the outer flat surfaces thereof made of a material of substantially harder and more durable composition than the annular center portion thereof.

Presently available roller skate wheels for utilization on wooden floors, or the like, which are normally provided in a skating rink, are usually constructed from fine grained hard wood or a composition rubber material. The wooden wheels have many disadvantages in that they not only rapidly become worn and inefficient, but also have a tendency to skid or slip sideways on the floor, thus necessitating the application of resin, or the like, to the floor to reduce the hazardous condition resulting from accidental slippage. Further, the wooden wheel creates considerable noise, which, combined with dust in the air from the resin, results in an unpleasant condition for the skater. A wheel made from a suitable blend or composition of synthetic rubber and resin appears to substantially reduce many of the disadvantages of the wooden wheel. The characteristics of this composition material cause a substantial reduction of accidental slippage, and thereby eliminate the necessity for application of resin to the floor. The composition rubber wheel is also considerably less noisy in operation, and thus greatly enhances the environment for the skater within the skating rink. The corners of wheels of such construction, however, have been found, in actual usage, to be susceptible to a considerable amount of wear. The inside corners or edges of the front wheels of the skate usually become worn much faster than the outside corners of the rear wheels. Thus, the wheels must be frequently rotated in much the same manner as the tires of an automobile to prolong the useful life thereof. It will be apparent that this soon becomes laborious and a time consuming task.

It will be apparent that a wheel constructed of a blend of rubber and resin which has been sufficiently hardened will resist wear and provide a longer useful life for the wheel. It has been found, however, that the characteristics of the hardened composition are not desirable for roller skate wheels. A wheel constructed entirely of such material may tend to become very slick and as a result will often slide on the skating rink floor instead of rolling thereon. It is desirable, therefore, to provide a wheel having the friction characteristics necessary to enhance the rolling action of the wheel and yet of a durability to resist excessive wear at the corners thereof.

The present invention contemplates a skate wheel which combines these qualities and thereby overcomes the inherent disadvantages of both the conventional composition rubber wheel and the wooden wheel. The novel wheel comprises an annular portion of a suitable composition disposed between two layers of a similar material of substantially greater hardness and durability. This laminated type of construction has been found to increase the useful life of a skate wheel approximately threefold, thus providing an economical and efficient skate wheel not heretofore available.

It is, therefore, an important object of this invention to provide a roller skate wheel which is so designed and constructed to resist wear at outer edges thereof, thus providing a substantially longer useful life therefor.

It is another object of this invention to provide a roller skate wheel having desirable rolling qualities on a roller rink floor in combination with durability to enhance the enjoyment of skating.

It is still another object of this invention to provide a roller skate wheel which requires a minimum of maintenance during the useful life thereof.

It is a further object of this invention to provide a roller skate wheel of simple and durable construction and which is economical in operation.

Other objects and advantages of the invention will be evident from the following detailed description, read in conjunction with the accompanying drawings, which illustrate my invention.

Figure 1:
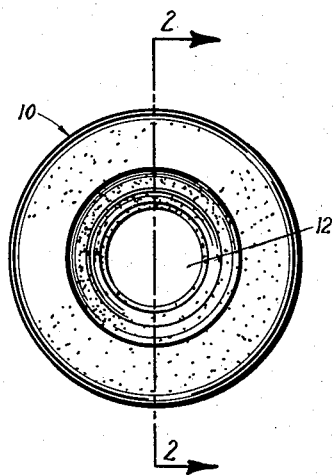
Figure 1 is a side elevational view of a skate wheel embodying the invention.
Figure 2:
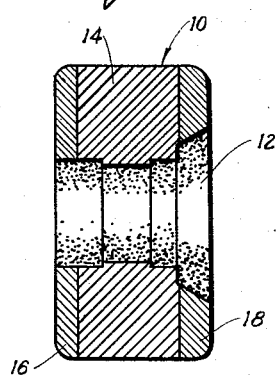
Figure 2 is a sectional view of a skate wheel embodying the invention taken on line 2—2 of Fig. 1.

Referring to the drawings in detail, reference character 10 refers in general to a skate wheel of substantially annular configuration provided with a suitable central bore 12 therethrough adapted to receive the axle member (not shown) of a roller skate. The bore is shown with a tapered opening, but it will be apparent that it is not limited to such, and the bore configuration may be varied as desired. The wheel 10 comprises an annular portion 14, preferably made of a suitable blend of nitrile rubber and a phenolic resin, but not limited thereto, and disposed between two outer disc shaped members 16 and 18 (Fig. 2). The discs 16 and 18 are preferably constructed from a similar blend of rubber and resin, but having a substantially greater hardness and durability than the annular member 14.

The skate wheel 10 may be constructed or molded in any suitable manner well known in the industry, such as extrusion disc process or a granular process. In the extrusion disc operation, a disc, such as 16 or 18, of the harder composition of material may first be disposed within a suitable mold (not shown) which is preferably substantially the desired configuration of the wheel. A central portion, such as the portion 14, is then disposed within the mold immediately above the first disc, and a second disc is placed thereon. The mold is then placed in a suitable mold press, or the like, and sufficient heat and pressure may be applied to substantially fuse the three layers of material together. A granular process of molding may be utilized, if desired, wherein a bottom layer of granules of the harder composition are first disposed within the mold. A layer of granules of the intermediate portion material is then added to the mold, and a top layer or the granules of the harder material completes the mold. The mold is then subjected to sufficient heat and pressure by any suitable means to form the skate wheel in the desired shape. These processes are well known, thus the novel design of the skate wheel adapts itself to uttilization of presently available equipment, thereby causing no additional expense for manufacture.

The design and construction hereinbefore set forth provides a novel skate wheel which may have a useful and efficient life of approximately three times that of presently available wheels. The annular portion 14 is subjected to much of the rolling action during use of the wheel, and the temperance of this central portion is particularly adapted to provide a minimum of resistance to rolling, and has proper friction characteristics therefor, thereby facilitating the ease of utilization. The hardened outer discs are subjected to the greater stress and strain during the skaters action of turning or the like, and the hardness and durability of the composition of these outer layers will substantially reduce accidental slippage and wear thereof, thus in the overall, providing a practical and efficient skate wheel.

From the foregoing, it will be apparent that the present invention provides a novel skate wheel which utilizes the desirable characteristics of a composition rubber wheel and simultaneously overcomes the inherent disadvantages thereof. The combination of the inner annular portion and the hardened outer discs provides a skate wheel of unusually good skating characteristics and which has a substantially longer useful life requiring a minimum of maintenance. Thus, the novel wheel provides a long lived and economical roller skate wheel not presently available.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A wheel for a roller skate and comprising a unitary central annular member consisting of a composition of nitrile rubber and phenolic resin, a disc disposed adjacent each side of the central portion and consisting of a composition having considerably greater hardness and durability, said wheel provided with an aperture therethrough to assist in securing the wheel to the roller skate, and said discs fused to the annular member by application of heat and pressure to provide a laminated structure for the wheel.

2. A laminated roller skate wheel comprising a unitary annular body member consisting of a composition of nitrile rubber and phenolic resin, an annular disc member disposed on each side of the annular body portion and fused thereto by application of heat and pressure, each of said disc members consisting of a composition similar to that of the annular body portion but characterized by having a greater hardness and durability, and an axial bore extending through the discs and the annular body portion.

References Cited in the file of this patent

UNITED STATES PATENTS

| | | |
|---|---|---|
| 307,826 | Worchester | Nov. 11, 1884 |
| 913,687 | Bryant | Mar. 2, 1909 |
| 1,664,352 | Coleman | Mar. 27, 1928 |
| 2,472,087 | Bierman | June 7, 1949 |
| 2,669,485 | Newman et al. | Feb. 16, 1954 |

FOREIGN PATENTS

| | | |
|---|---|---|
| 708,876 | Great Britain | May 12, 1954 |